Sept. 6, 1949.     N. M. REDMOND, SR     2,481,152
PIPE AND SEWER CLEANING APPARATUS
Filed Oct. 12, 1945

INVENTOR
NORBERT M. REDMOND, SR.
BY
ATTORNEY

Patented Sept. 6, 1949

2,481,152

UNITED STATES PATENT OFFICE 2,481,152

PIPE AND SEWER CLEANING APPARATUS

Norbert M. Redmond, Sr., New Orleans, La.

Application October 12, 1945, Serial No. 621,986

1 Claim. (Cl. 15—104.06)

The present invention relates to pipe and sewer cleaning machines and apparatus, for the purpose of removing obstructions and clogged matter from such pipes or sewers. The primary object of the invention is to provide a flexible, expansible and collapsible, funnel-shaped plug or head, with control rope attached, adapted for insertion within a pipe or drain sewer with its tapered end innermost and with its flared and flexible outer margins adapted for frictionally contacting the circular walls of the pipe or sewer, whereby water may be flushed into the pipe or sewer from its outer end, and filling into the open and flared end of the plug or head will drive same inwardly along the pipe or sewer and thus serve to clear same of obstructions, the device being controlled and operated by means of the attached control rope.

Another object of the invention is to provide in a device or apparatus of the kind referred to, means for scalloping or fluting the peripheral margin of the flared and flexible outer end of the funnel-shaped plug or head at its point of contact with the walls of the pipe or sewer, thereby providing channels through which the pent-up water within the sewer may flush and flow for facilitating the clearing of obstructions from the pipe or sewer.

Still another object of the invention is to provide in a device or apparatus of the kind referred to, independent means for anchoring and holding the described water plug or head fixedly in position within the pipe or sewer, with the flexible peripheral margins of the flared outer end thereof in fixed and unbroken contact with the walls of the pipe or sewer, for the purpose of damming and holding the water as pent up outwardly thereof, from flowing on through the pipe or sewer, while same may be in process of repair inwardly of the said plug or head.

With the above stated objects in view, together with such other and additional objects and advantages as may be pointed out in the following specification, attention is now directed to the accompanying drawing, wherein is illustrated a preferred embodiment of the invention, and wherein Figure 1 is a longitudinal section through a section of sewer pipe and through a water plug or head constructed in accordance with this invention and mounted therein, the outer, annular and flexible lip of the plug being here shown as fully and completely in contact with the inner curved surfaces of the sewer pipe, for the purpose of directing the flow of water centrally through the plug as required in one phase of the cleaning operation.

Figure 2:
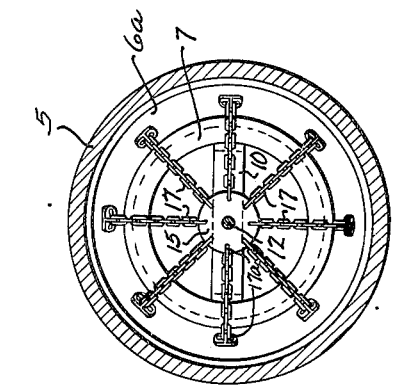
Figure 2 is a cross-section on the line 2—2 of Figure 1.

The water plug or head constituting the subject matter of this invention is of hollow and conical formation from end to end, and is designed for temporarily inserting within any pipe or sewer, such as represented at 5 in the drawing, for the purpose either of clearing and freeing such pipe or sewer of any clogging matter or obstruction that may accumulate therein from time to time, or for stopping the flow of water or liquid matter through the pipe or sewer in the process of making repairs to the pipe or sewer. This water plug is represented generally at 6, is hollow interiorly as shown, and is formed conically from its outer end to its inner end. It is composed as here shown, of three sections, 6a, 6b and 6c, each annular in cross-section and of successively reduced and complemental diameters so as to form and provide a uniformly regular, conical structure from end to end. The outer end section 6a of the plug is comparatively short and is formed of live rubber or other suitably flexible material, while the connected inner sections 6b and 6c are formed of water-proofed canvas or the like material. These sections are operatively joined together end to end by means of rigid supporting rings 7 of iron, steel or other desirable material. In this assembly the meeting annular margins of the outer section 6a and the inner section 6b are overlaid, and a supporting ring 7 is inserted inwardly at the juncture and permanently locked in place by means of rivets 8 or other conventional means. In a similar manner another but smaller ring 7 connects the overlapped and meeting margins of the sections 6b and 6c, said ring being similarly locked in place by rivets 8 or other means. Of course the sections 6b and 6c may be constructed integrally if preferred, but in any event the supporting rings 7 are necessary in order to maintain the structure in operatively expanded position.

The reduced inner end of the plug is joined by means of other rivets 8 to an apertured metal outlet or nozzle 9, this nozzle being threaded at its exposed end to receive a complementally threaded cap 19, the purpose and function of which will be later explained.

Figure 4:
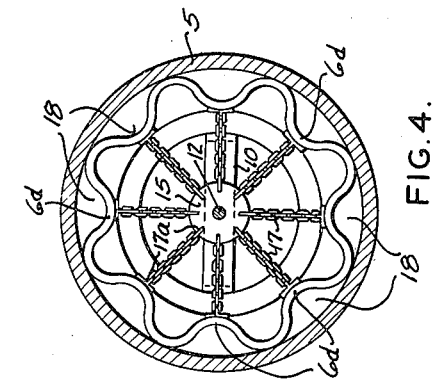
Figure 4 is a cross-section on the line 4—4 of Figure 3.
Figure 1:
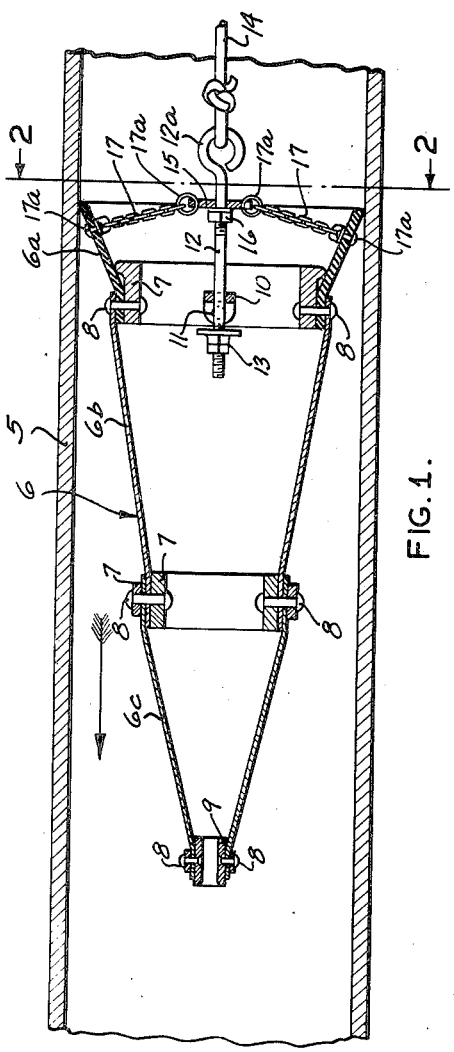
Figure 3:
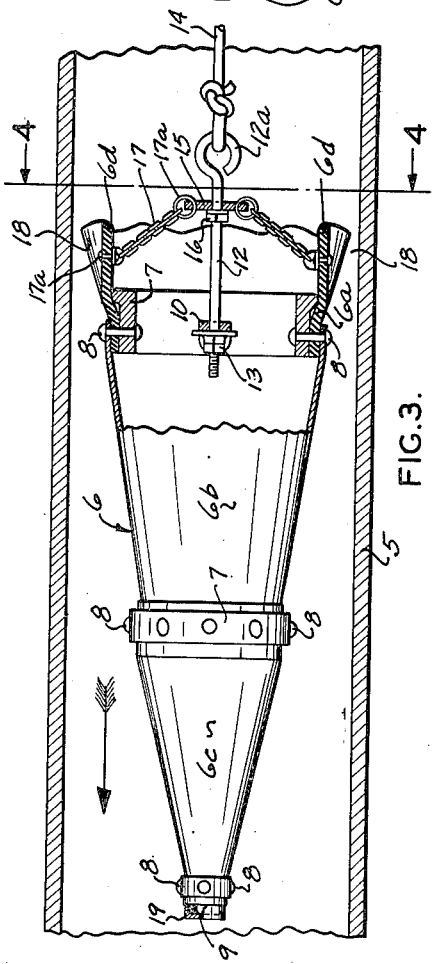
Figure 3 is a view similar to that of Figure 1, showing however the annular and flexible outer lip of the plug as contacting the inner surfaces of the sewer pipe only at regularly spaced intervals, or in a fluted relation thereto, for the purpose of providing intermediate passages for the flow of water peripherally past the plug as required in another phase of the cleaning operation.

A flat cross bar or stay 10 is extended diametrically across the outer ring 7, the same being anchored in place by bolts or rivets 11 passed through the angularly turned ends of the bar and into the ring. A control rod 12 is passed slidably and medially through this cross bar, the same being threaded at its inner end to engage a tapped nut 13, and the outer end thereof being looped as at 12a for engaging the inner end of an operating rope or cable 14 which is knotted thereto as shown. A circular draw plate 15 is mounted through its center upon the rod 12, and is supported in an outwardly disposed relation upon the rod by means of a stop lug or nut 16. A plurality of draw chains 17 are extended radially from the plate 15 to the outer and resilient section 6a, in a regularly spaced relation, the ends of these chains being secured to the plate and inner face of the section 6a by rings and rivets as indicated at 17a. The chains 17 as thus arranged and extended connect somewhat angularly with the resilient section 6a, and are of just the right length to make the connections, without any sagging. Hence on the outward slidable movement of the control rod 12 as drawn upon by the cable 14, it is obvious that the chains draw and bend the resilient ring or section 6a inwardly at regularly spaced points, as shown at 6d in Figures 3 and 4, thus forming the intermediate, peripherally disposed channels or water passages 18 immediately adjacent the inner surfaces of the pipe or sewer 5, the extent or depth of these channels depending upon the adjustment of the nut 13 upon the rod 12 for regulating the slidable movement of this rod through the cross-bar 10. Through these water passages 18, as well as through the nozzle 9, the water may flow freely in the process of cleaning a pipe or sewer, in a manner later more fully explained. It is obvious too, that by means of turning the nut 13 to the required degree upon the rod 12, the play or travel of this rod through the cross bar 10 may be reduced to a minimum or stopped altogether, so that the resilient outer lip of the section 6a will fully and continuously contact the inner surfaces of the pipe or sewer at all points, regardless of any pull upon the rope or cable 14. The purpose of this arrangement will also be later pointed out, in the explanation of the mode of use and operation.

In the use of this cleaning device or apparatus, the same is inserted into the pipe or sewer that is to be cleaned, through any opening as formed in the line in conventional manner, and with the smaller and tapered inner end of the device foremost, all movement of the device as well as water as imagined as flowing through the pipe or sewer being from the right hand to the left hand, as indicated by the arrows in the drawing. The device being attached to the rope or cable 14 is of course at all times under the control of the operator, who may thus move the device forward or backward through the pipe or sewer 5 as may be found desirable. The pipe or sewer is then filled with water through the connecting manhole (not shown). In doing this a considerable head or pressure is developed in the pipe or sewer, whereby the outer resilient section 6a is pressed snugly against the inner surfaces of the pipe or sewer. This action creates enough friction to firmly hold the element in place, thus functioning as a water-plug. Simultaneously the canvas sections 6b and 6c stiffen out and expand similarly to the action of a fire hose, whereby the water pressure is constricted and narrowed down and forced through the nozzle 9 with a considerable force, the stream of which fluctuating from side to side effectually operates to clean the walls of the pipe or sewer. After the obstructions in the pipe or sewer have thus been softened up, the cable 14 may be pulled upon, thus exerting a pulling effect upon the chains 17 and drawing spaced portions of the section 6a inwardly for forming the water passages 18 through which the water may flow for cleaning or reinforcing the cleaning operation of the water flow through the nozzle 9. While the apparatus is in the described position the water rushing through the fluted passages causes the entire device to oscillate, thus aiding the cleansing operation. At this time the device is released by loosening of the cable 14, and the device slips inwardly into the pipe or sewer, where the friction of the resilient head or section 6a against the inner walls of the pipe or sewer serves again to hold it for further and repeated cleaning operations. The same procedure is repeated until the entire pipe or sewer is cleaned. Where it may be necessary to make repairs to such pipe line or sewer, the screw cap 19 is turned upon the end of the nozzle 9, and the nut 13 is then turned upon the rod 12 to the point where the outer lip of the section 6a frictionally contacts the inner walls of the pipe or sewer 5, regardless of any strain or pull upon the cable 14. Thus the device or plug 6 is held stationarily in position by means of the cable 14, and functions as an effectual stoppage against the flow of water or liquid matter during the process of making repairs at any given point along the line. In lieu of the turning up and positioning of the nut 13 for the purpose above described, a separate rope or cable (not here shown) may be secured at its inner end, to the cross bar 10 and extended out to the hand of the operator, who may tie the outer end thereof to any fixed support. This expedient is so simple and conventional, that no separate showing thereof is made in the drawing.

It is obvious that from the construction as shown, and from the flexible nature of the canvas sections 6b and 6c, that the water plug or head 6 under the pressure of water as filled into the pipe or sewer outwardly of it, may be worked through and around any curved sections or joints of the pipe or sewer, as may be required in the work of cleaning or repair, and while there is here shown certain embodiments of the invention and specific structural features thereof, the described structural features may be changed or modified as may be found desirable, within the scope however of the appended claim.

I claim:

In a device of the kind described, an elongated and conical water plug adapted for insertion within and through a sewer pipe for cleaning or repairing same, the flared outer margins of the plug being of flexible material for frictional contact with the curved inner walls of the pipe, a nozzle seated through the apex of the reduced inner end of the plug, a removable cap for the outer end of the nozzle, a supporting ring seated transversely within the flared outer end of the plug inwardly of the flexible margins thereof, a flat cross-bar extended diametrically across the ring, the said bar being apertured along the axis of the plug, a control rod passed slidably through said aperture of the cross-bar, the same being threaded at its inner end as projected through the aperture of the cross-bar and having an adjustment nut mounted thereon, an operating cable secured at its inner end to the outer end of the control rod, a circular draw-plate mounted through an apertured center upon the control rod in outwardly spaced relation to the inner end of the rod, a stop-nut on the control rod at the inner side of the draw-plate, a plurality of draw-chains extended radially from the draw-plate to the outer flared and flexible margins of the plug in regularly spaced relation, the said plug being constructed of conical sections of flexible material, each annular in cross section when expanded and of successively reduced and complemental diameters at their ends so as to form and complete a uniformly regular and conical structure from end to end, supporting rings seated transversely in the successively reduced inner ends of the sections and adapted to enter the relatively flared outer ends of adjacent sections, and means for securing the sections together at said rings.

NORBERT M. REDMOND, Sr.

REFERENCES CITED

The following references are of record in the file of this patent:

UNITED STATES PATENTS

| Number | Name | Date |
|---|---|---|
| 876,566 | Lehnert | Jan. 14, 1908 |
| 1,035,994 | Mueller | Aug. 20, 1912 |
| 1,177,629 | Johnson | Apr. 4, 1916 |
| 1,806,478 | Long | May 19, 1931 |

FOREIGN PATENTS

| Number | Country | Date |
|---|---|---|
| 287,021 | Great Britain | Mar. 15, 1928 |